US012621579B2

(12) United States Patent
Oh et al.

(10) Patent No.: US 12,621,579 B2
(45) Date of Patent: May 5, 2026

(54) PIXEL-CIRCUIT SUPPLY NOISE CANCELLATION

(71) Applicant: OMNIVISION TECHNOLOGIES, INC., Santa Clara, CA (US)

(72) Inventors: Hacksoo Oh, Sunnyvale, CA (US); Amit Mittra, Sunnyvale, CA (US)

(73) Assignee: Omnivision Technologies, Inc., Santa Clara, CA (US)

( * ) Notice: Subject to any disclaimer, the term of this patent is extended or adjusted under 35 U.S.C. 154(b) by 112 days.

(21) Appl. No.: 18/637,879

(22) Filed: Apr. 17, 2024

(65) Prior Publication Data

US 2025/0330723 A1      Oct. 23, 2025

(51) Int. Cl.
| | |
|---|---|
| *H04N 25/30* | (2023.01) |
| *H04N 25/59* | (2023.01) |
| *H04N 25/60* | (2023.01) |
| *H04N 25/709* | (2023.01) |
| *H04N 25/77* | (2023.01) |

(52) U.S. Cl.
CPC ........... *H04N 25/30* (2023.01); *H04N 25/709* (2023.01); *H04N 25/77* (2023.01)

(58) Field of Classification Search
CPC ....... H04N 25/30; H04N 25/709; H04N 25/77
See application file for complete search history.

(56) References Cited

U.S. PATENT DOCUMENTS

| | | | | |
|---|---|---|---|---|
| 7,782,383 B2 * | 8/2010 | Olsen | ..................... | H04N 25/65 |
| | | | | 257/292 |
| 9,979,912 B2 * | 5/2018 | Suzuki | ................... | H04N 25/00 |
| 11,128,829 B2 * | 9/2021 | Oh | ......................... | H04N 25/77 |
| 11,381,765 B2 * | 7/2022 | Chen | .................... | H10F 39/811 |

* cited by examiner

*Primary Examiner* — Ahmed A Berhan
(74) *Attorney, Agent, or Firm* — Christensen O'Connor Johnson Kindness PLLC

(57) ABSTRACT

Systems and methods for pixel-circuit supply voltage noise cancellation are described herein. In one embodiment, a pixel circuit of an imaging sensor includes: a front-end circuit having a photodiode configured to generate electrical charges that accumulate at a floating diffusion FD0 as a photodiode voltage. The pixel circuit also includes a signal storage circuit coupled to the front-end circuit, the signal storage circuit including a common floating diffusion FDC configured to store a common floating diffusion voltage corresponding to the photodiode voltage. A unity gain circuit is coupled to the signal storage circuit. The unity gain circuit includes an operational amplifier that generates a control voltage VCTRL as an output voltage. The control voltage VCTRL includes the voltage noise component of the supply voltage PIXVDD. An output circuit is configured for outputting a signal voltage VS corresponding to the floating diffusion voltage.

20 Claims, 5 Drawing Sheets

PIXEL-CIRCUIT SUPPLY NOISE CANCELLATION

BACKGROUND INFORMATION

Field of the Disclosure

This disclosure relates generally to the design of image sensors, and in particular, relates to image sensors having reduced supply voltage noise.

Background

Image sensors have become ubiquitous. They are widely used in digital still cameras, cellular phones, security cameras, as well as medical, automotive, and other applications. The technology for manufacturing image sensors continues to advance at a great pace. For example, the demands for higher image sensor resolution and lower power consumption motivate further miniaturization and integration of image sensors into digital devices.

Image sensor operates in response to image light coming from an external scene and being incident upon the image sensor. An image sensor includes an array of pixels having photosensitive elements (e.g., photodiodes) that absorb a portion of the incident image light and, in response, the photosensitive elements generate corresponding electrical charge. The electrical charge of individual pixels can be measured as an output voltage of each photosensitive element. In general, the output voltage varies as a function of the intensity and duration of the incident light. The output voltage of individual photosensitive elements is used to produce a digital image (i.e., image data) representing an external scene.

Generally, the resulting output voltages of the photosensitive elements are read out through electronic circuitry to generate image frames. However, the output voltages may be sensitive to electrical noise in the electronic circuitry. Therefore, systems and methods are needed for reduced electrical noise and improved accuracy of the readout for the image sensors.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
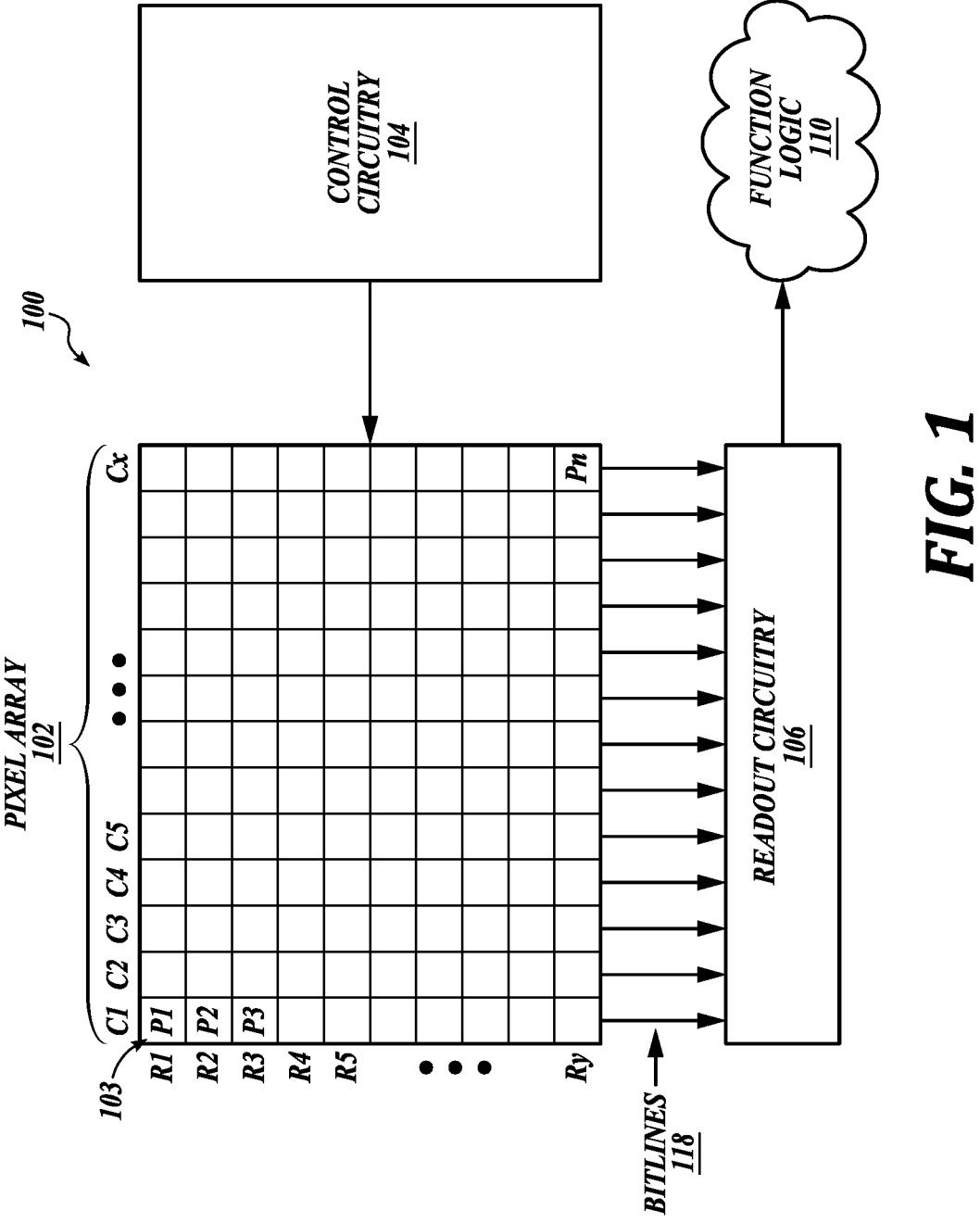
FIG. 1 illustrates an imaging system according to an embodiment of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention.

Also, common but well-understood elements that are useful or necessary in a commercially feasible embodiment are often not depicted in order to facilitate a less obstructed view of these various embodiments of the present invention.

DETAILED DESCRIPTION

Image sensors, and in particular, image sensors that include color routers are disclosed. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

From the foregoing, it will be appreciated that specific embodiments of the technology have been described herein for purposes of illustration, but that various modifications may be made without deviating from the disclosure. Moreover, while various advantages and features associated with certain embodiments have been described above in the context of those embodiments, other embodiments may also exhibit such advantages and/or features, and not all embodiments need necessarily exhibit such advantages and/or features to fall within the scope of the technology. Where methods are described, the methods may include more, fewer, or other steps. Additionally, steps may be performed in any suitable order. Accordingly, the disclosure can encompass other embodiments not expressly shown or described herein. In the context of this disclosure, the terms "about," "approximately," "generally," etc., mean+/−5% of the stated value.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

Briefly, the embodiments of the present technology are directed to image sensors having reduced electrical noise and improved accuracy of the voltage readout of the photodiodes. In some embodiments, photodiode voltage that corresponds to accumulated electrical charge is ultimately read out as a differential voltage with respect to a control (reference) voltage. However, the photodiode voltage is a subject to voltage noise in the supply voltage of the readout circuitry, which negatively affects the accuracy of determining the photodiode voltage. Therefore, in some embodiments of the present application, the control voltage is purposely also subjected to the same voltage noise of the supply voltage through suitable passive components (e.g., capacitors) and active components (e.g., an op-amp operating as a unity gain). Since the photodiode voltage is ultimately acquired as a differential voltage between the control voltage and the voltage of the photodiode, and because both the control voltage and the voltage of the photodiode are affected by the voltage noise in an equivalent way, the noise content of the control voltage and the photodiode voltage tend to cancel each other. As a result, a more accurate readout of the voltage of the photodiode may be obtained by eliminating or at least reducing influence of the supply noise on the voltage difference between the control voltage and the photodiode voltage.

FIG. 1 illustrates an example imaging system 100 in accordance with an embodiment of the present disclosure. The imaging system 100 includes a pixel array 102, a control circuitry 104, a readout circuitry 106 (also referred to as a pixel circuitry) and a function logic 110. In one example, the pixel array 102 is a two-dimensional (2D) array of photodiodes or image sensor pixels 112 (e.g., pixels P1, P2 . . . , Pn). As illustrated, the photodiodes are arranged into rows (e.g., rows R1 to Ry) and columns (e.g., column C1 to Cx). In operation, the photodiodes acquire image data of an outside scene, which can then be used to render a 2D image of the person, place, object, etc. However, in other embodiments the photodiodes may be arranged into configurations other than rows and columns.

In an embodiment, after each pixel 112 in the pixel array 102 acquires its image charge, the image data is read out by the readout circuitry 106 via bitlines 118, and then transferred to a function logic 110. In various embodiments, the readout circuitry 106 may include signal amplifiers, analog-to-digital (ADC) conversion circuitry and data transmission circuitry. The function logic 110 may store the image data or even manipulate the image data by applying post image effects (e.g., crop, rotate, remove red eye, adjust brightness, adjust contrast, or otherwise). In some embodiments, the control circuitry 104 and function logic 110 may be combined into a single functional block to control the capture of images by the pixels 112 and the readout of image data from the readout circuitry 106. The function logic 110 may be a digital processor, for example. In one embodiment, the readout circuitry 106 may read one row of image data at a time along readout column lines (bitlines 118) or may read the image data using a variety of other techniques, such as a serial readout or a full parallel readout of all pixels simultaneously (not illustrated).

In one embodiment, the control circuitry 104 is coupled to the pixel array 102 to control operation of the plurality of photodiodes in the pixel array 102. For example, the control circuitry 104 may generate a shutter signal for controlling image acquisition. In one embodiment, the shutter signal is a global shutter signal for simultaneously enabling all pixels within the pixel array 102 to simultaneously capture their respective image data during a single data acquisition window. In another embodiment, the shutter signal is a rolling shutter signal such that each row, column, or group of pixels is sequentially enabled during consecutive acquisition windows. In another embodiment, image acquisition is synchronized with lighting effects such as a flash.

In one embodiment, readout circuitry 106 includes analog-to-digital converters (ADCs), which convert analog image data received from the pixel array 102 into a digital representation. The digital representation of the image data may be provided to the function logic 110. In some embodiments, the data transmission circuitry 108 may receive the digital representations of the image data from the ADCs in parallel and may provide the image data to the function logic 110 in series.

In different embodiments, imaging system 100 may be included into a digital camera, cell phone, laptop computer, or the like. Additionally, imaging system 100 may be coupled to other pieces of hardware such as a processor (general purpose or otherwise), memory elements, output (USB port, wireless transmitter, HDMI port, etc.), lighting/flash, electrical input (keyboard, touch display, track pad, mouse, microphone, etc.), and/or display. Other pieces of hardware may deliver instructions to imaging system 100, extract image data from imaging system 100, or manipulate image data supplied by imaging system 100.

Figure 2:
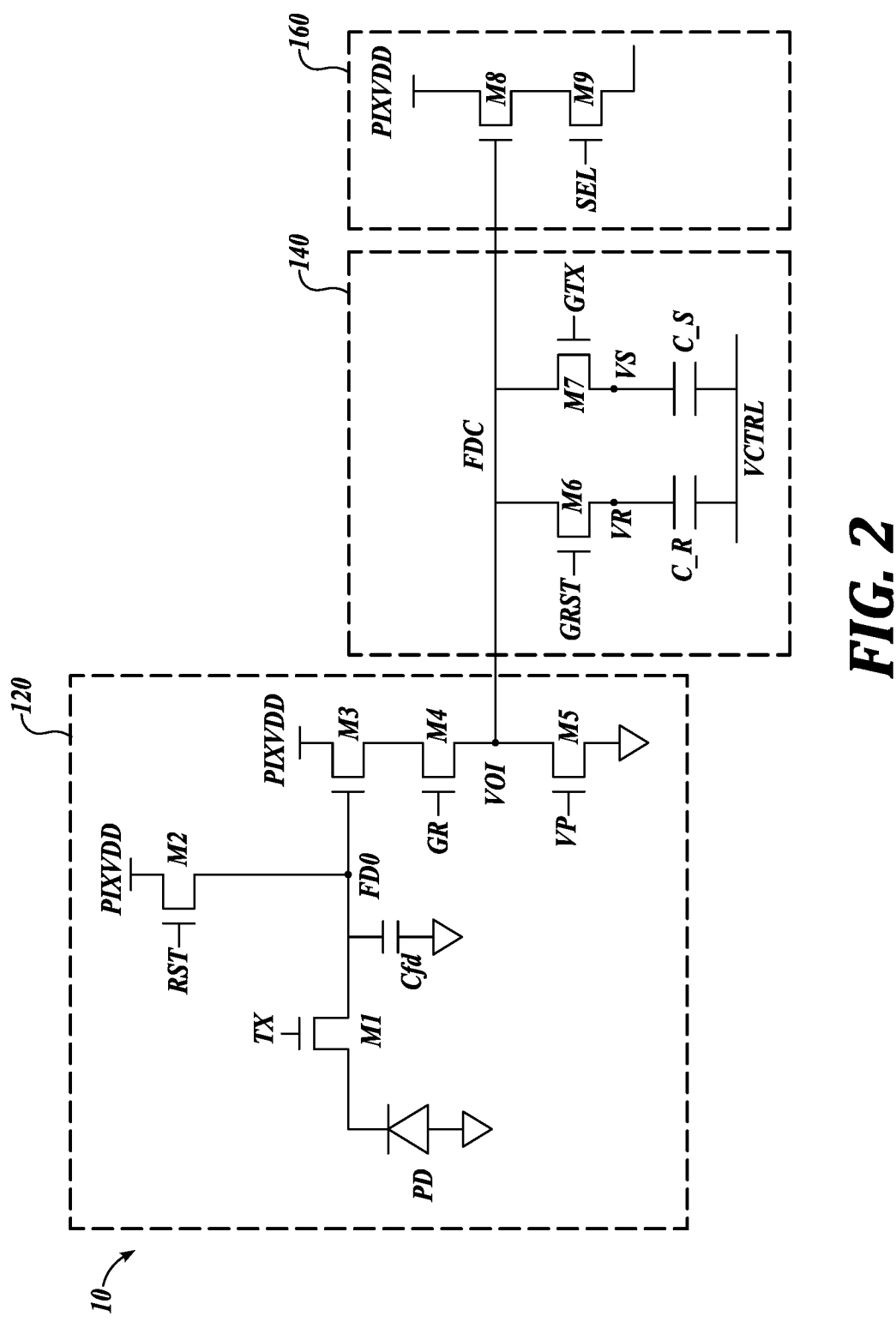
FIG. 2 is a schematic illustrating pixel circuit according to an embodiment of the present disclosure.

FIG. 2 is a schematic illustrating pixel circuit according to an embodiment of the present disclosure. FIG. 2 illustrates a pixel circuit 10 that includes a front-end circuit 120, a signal storage circuit 140 and an output circuit 160. The signal storage circuit 140 is coupled to the front-end circuit 120, and the output circuit 160 is coupled to the signal storage circuit 140. When exposed to light, a photodiode PD generates electrical charges that accumulate at a floating diffusion FD0 that is in some embodiments connected to a floating diffusion capacitor Cfd. A person of ordinary skill would understand that the illustrated capacitor Cfd is not necessarily implemented as a conductive plate capacitor, but may be implemented within the doped semiconductor layers. In practice, the combination of the floating diffusion FD0 and capacitor Cfd is often collectively referred to as the 'floating diffusion.'

Flow of the electrical charges generated by the photodiode PD toward the floating diffusion FD0 is controlled by a transistor M1 based on a control signal TX that is coupled to a gate terminal of the transistor M1 (also referred to as a 'first transistor' or a 'transfer gate'). When the TX signal sets the transistor M1 to ON state, accumulated charges from the photodiode PD are transferred to the floating diffusion FD0. Voltage readout of the floating diffusion FD0 is timed, inter alia, through the operation of a transistor M2 (also referred to as a 'reset gate' or a 'second transistor') that may be coupled to a supply voltage PIXVDD and may receive a reset control signal RST on its gate terminal.

A gate terminal, a drain terminal and a source terminal of a transistor M3 (also referred to as a 'third transistor') are coupled to the floating diffusion FD0, the supply voltage PIXVDD and a drain of a transistor M4, respectively. The transistor M4 (also referred to as a 'fourth transistor') is coupled between the source terminal of the transistor M3 and drain terminal of a transistor M5 (also referred to as a 'fifth transistor'). A gate terminal of the transistor M4 is coupled to a control signal GR (for example, a ground voltage or another voltage). A gate terminal of the transistor M5 is coupled to a control signal VP. The voltage at the floating diffusion FD0 controls the ON/OFF state of the gate of transistor M3 and the control signal GR controls the ON/OFF state of the gate of transistor M4. When the gates of the transistors M3 and M4 are set to ON state, the electrical charges accumulated at the floating diffusion FD0 are transferred through an output terminal VO1 as a common floating diffusion FDC, provided, of course, that the control signal VP sets the gate of the transistor M5 to an OFF state. A person of ordinary skill would understand that voltages at FD0 and FDC are generally related as FDC=FD0–VGS, where VGS is voltage drop between gate and source for the transistor M3, because in most practical situations the voltage drop through the transistor M4 is relatively small, i.e., significantly smaller than voltage VGS of the transistor M3.

It should be noted that the reference signal FDC that is stored in the signal storage circuit 140 is pulled up from original voltage level FD0 to a higher voltage level according to a voltage increment ΔV applied to the control voltage VCTRL. A person of ordinary skill would understand that in absence of this voltage pullup, the available output voltage range may be depressed due to voltage drops respectively introduced by the transistor M3 and M8. More particularly, the voltage increment ΔV should be greater than a threshold voltage (i.e., a turn-on voltage) of the transistor M8 (or the transistor M3) to ensure that the transistor M8 may be turned ON. For example, the voltage increment ΔV may be equal or greater than a voltage difference between the gate terminal and the source terminal of the transistor M3, in order to compensate the voltage drop introduced by the transistor M3. Therefore, the voltage increment ΔV may be equal or greater than a voltage difference between the gate terminal and the source terminal of the transistor M8, in order to compensate the voltage drop introduced by the transistor M8. Operation of the signal storage circuit 140 is described below.

In some embodiments, the signal storage circuit 140 includes a plurality of transistors such as a transistor M6 (also referred to as a 'sixth transistor') and M7 (also referred to as a 'seventh transistor') and a plurality of capacitors such as capacitors C_R (also referred to as a 'reference voltage capacitor') and C_S (also referred to as a 'signal voltage capacitor'). The transistor M6 is coupled between the common floating diffusion FDC and the capacitor C_R, whereas the transistor M7 is coupled between the common floating diffusion FDC and the capacitor C_S. A gate of the transistor M6 is controlled by signal GRST and a gate of the transistor M7 is controlled by signal GTX. Capacitors C_R and C_S are coupled to the control voltage VCTRL on one side, and to the transistors M6 and M7 on the other side. VR signifies a reference voltage value at a node between the source terminal of the transistor M6 and capacitor C_R, and VS signifies a signal voltage value at a node between the source terminal of the transistor M7 and capacitor C_S. In operation, the voltages VR and VS may store a reference voltage and signal voltage, respectively. Voltage VS is representative of the common floating diffusion FDC, that is, voltage VS represents accumulation of the electrical charges there are generated in response to illumination of a particular photodiode PD.

The output circuit 160 may include a plurality of transistors such as a transistor M8 (also referred to an 'eight transistor') and M9 (also referred to a 'ninth transistor'). A gate terminal of the transistor M8 is coupled-to and controlled-by the voltage of the common floating diffusion FDC. A gate terminal of the transistor M9 is controlled by the row select signal SEL. A drain terminal of the transistor M8 is connected to the supply voltage PIXVDD, and a source terminal of the transistor M8 is connected to a drain terminal of the transistor M9. Operation of the row select signal SEL on the gate terminal of the transistor M9 enables a readout of the particular photodiode PD in a given row of the photodiodes.

Figure 3:
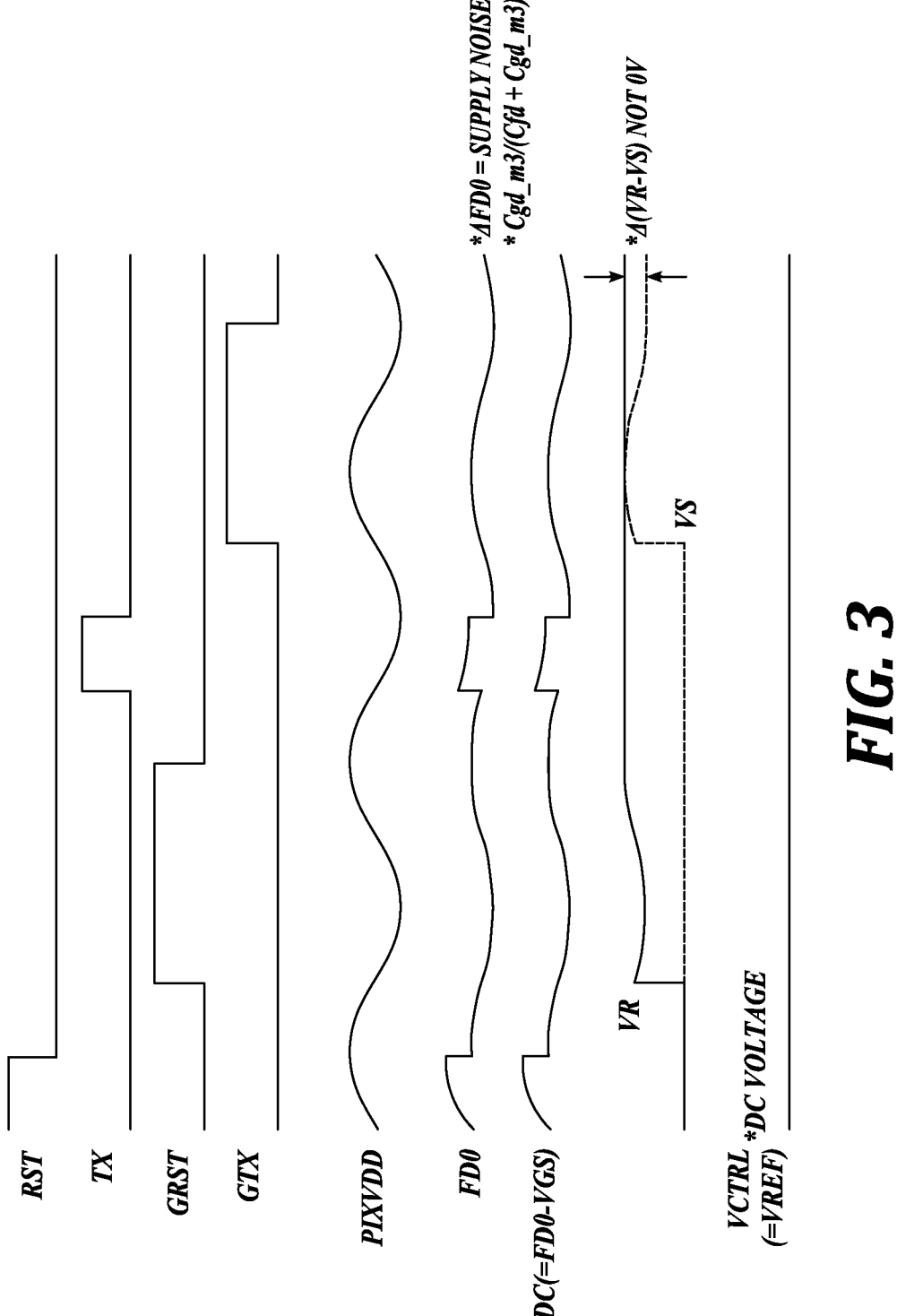
FIG. 3 is a timing diagram illustrating signals and control voltages for the pixel circuit shown in FIG. 2.

FIG. 3 is a timing diagram illustrating signals and control voltages for the pixel circuit shown in FIG. 2. In particular, the RST signal initiates the readout of the voltage VS, which, as explained above, corresponds to the electrical charges accumulated by illuminating the photodiode PD. The accumulated electrical charges are transferred to the floating diffusion FD0 by the transfer transistor M1, and further to the common floating diffusion FDC by the operation of transistors M3 and M4. Control signal GRST applied to the gate of the transistor M6 sets the reference voltage VR for the readout, and control signal GTX applied to the gate of the transistor M7 sets the signal voltage VS for the readout. However, in many practical situations the supply voltage PIXVDD includes a certain amount of noise, as illustrated in the graph. This noise in the supply voltage PIXVDD (also referred to as a 'supply noise') may couple to the voltage of the floating diffusion FD0 as: ΔFD0=supply noise*Cgd_m3/(Cfd+Cgd_m3), where Cgd_m3 is the gate-drain capacitance of the transistor M3, and Cfd is the capacitance of the floating diffusion. As a consequence, voltage of the floating diffusion FD0 also includes the supply noise, as shown in the graph of the FD0. Furthermore, voltage of the floating diffusion FD0 is transferred to the voltage of the common floating diffusion FDC as: FDC=FD0–VGS_m3. Therefore, the noise in the supply voltage PIXVDD also propagates to the voltage of the common floating diffusion FDC.

As shown in the schematics of FIG. 2, capacitors C_R and C_S are charged and discharged based on the control voltage VCTRL, which, in at least some embodiments, is a DC voltage. Therefore, when the signal GRST sets the transistor M6 to ON state, the reference voltage VR also becomes subjected to the noise in the supply voltage PIXVDD. Analogously, when the signal GTX sets the transistor M7 to ON state, the signal voltage VS is also subjected to the noise in the supply voltage PIXVDD. Furthermore, by the time the signal GTX sets the transistor M7 to ON state, the transistor M6 has been set to OFF state for a certain period of time, thus disconnecting the reference voltage VR from the supply noise, and starting the process of noise dissipation from the reference voltage as the time passes. As an overall result, the voltage values of the FDC, VR and VS are subjected to influence from the noise in the supply voltage PIXVDD in varied degrees, thus distorting the ultimate readout of the VR and VS voltage values after the transistors M6 and M7 are set to OFF states at different times by the control signals GRST and GTX, respectively.

Figure 4:
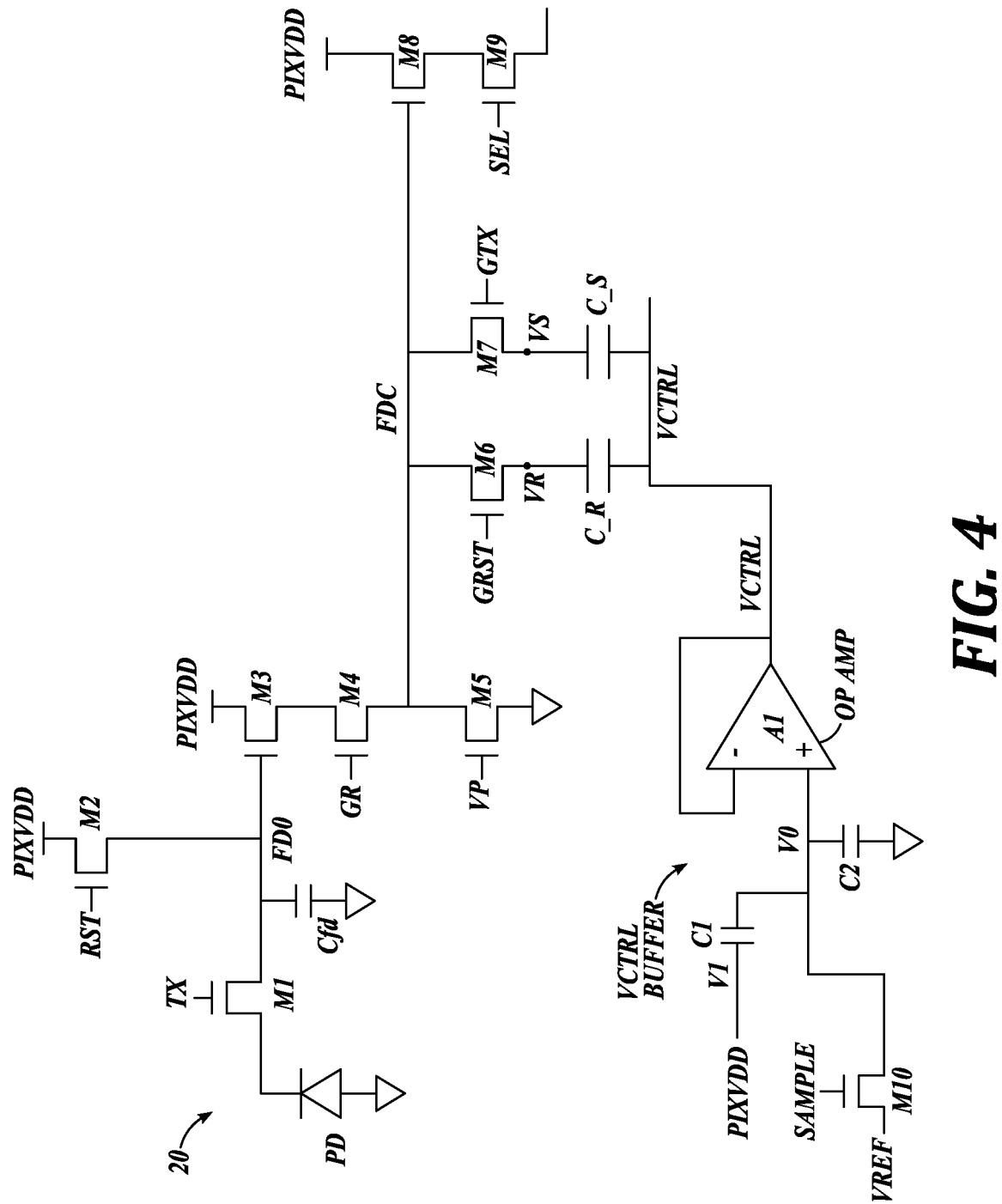
FIG. 4 is a schematic illustrating pixel circuit according to an embodiment of the present disclosure.

FIG. 4 is a schematic illustrating a pixel circuit 20 according to an embodiment of the present disclosure. Pixel circuit 20 of FIG. 4 is similar to that of the pixel circuit 10 of FIG. 2, except that the pixel circuit 20 also includes a unity gain circuit VCTRL BUFFER based on operational amplifier OP AMP. A person of ordinary skill would know that the illustrated VCTRL BUFFER circuit generates the VCTRL having a Hi or Lo output based on voltage comparison between the positive input (V0) to the operational amplifier and a preset threshold of the operational amplifier. Operation of the VCTRL BUFFER is described below.

In some embodiments, the SAMPLE voltage is first set to an appropriate value to set a gate of a transistor M10 (also referred to as a 'tenth transistor') to ON state. Under this condition, the V0 node is set to VREF voltage (also referred to as a 'bias voltage'), which is the bias voltage to initiate VCTRL BUFFER input transfer. Next, the SAMPLE voltage is set to place the transistor M10 in OFF state, thus making the V0 node be a floating node which follows up APIXVDD (i.e., the change of PIXVDD, which can also be interpreted as the nominal value of PIXVD plus the noise). As a result, the output voltage VCTRL of the OP AMP includes the noise component of the PIXVDD. The corresponding signal graphs are explained with reference to FIG. 5 below.

Figure 5:
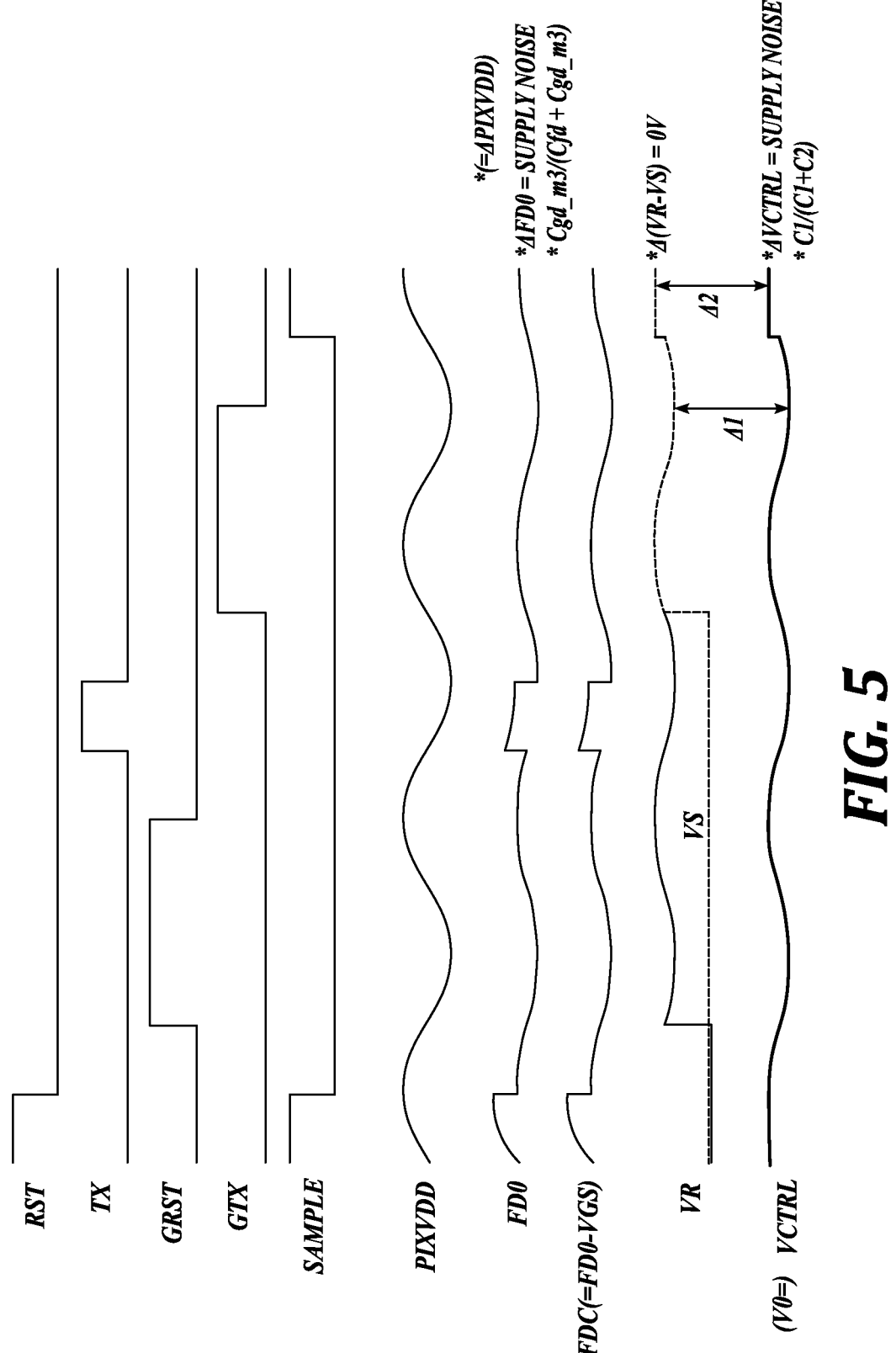
FIG. 5 is a timing diagram illustrating signals and control voltages for the pixel circuit shown in FIG. 4.

FIG. 5 is a timing diagram illustrating signals and control voltages for the pixel circuit shown in FIG. 4. As before, the supply voltage PIXVDD includes supply noise. The supply voltage PIXVDD is coupled to the FD0 node by a ratio of Cgd_m3/(Cfd+Cgd_m3). As a consequence, voltage of the floating diffusion FD0 also includes the supply noise, as shown in the graph of the FD0 and as expressed by: ΔFD0= (PIXVDD Supply noise)*Cgd_m3/(Cfd+Cgd_m3), where ΔFD0 represents noise component of the pixel voltage at the FD0 node (i.e., at the floating diffusion), Cgd_m3 is gate-drain capacitance of the transistor m3, and Cfd is the capacitance of the floating diffusion capacitor Cfd. Furthermore, voltage of the floating diffusion FD0 is transferred to the voltage of the common floating diffusion FDC as: FDC=FD0−VGS_m4. Contrary to the signal graphs shown in FIG. 3, the capacitors C_R and C_S are not anymore charged/discharged by the supply noise at the FDC node, because VCTRL at the output of the OP AMP now follows both phase and amplitude of the supply noise of the PIX-VDD for as long as the circuit values assure: C1/(C1+C2) =Cgd_m3/(Cfd+Cgd_m3). Stated differently, the noise content of the VCTRL becomes: ΔVCTRL=Supply noise*C1/ (C1+C2). As a result, the supply noise does not be affect differential voltage readouts, because the noise content is now present in each of the common floating diffusion FDC, reference voltage VR, signal voltage VS and control voltage VCTRL. Therefore, both VR and VS are identically (or at least proportionally) affected by the noise/signal sampling in response to signals GRST and GTX being set to high. Stated differently, after the control signal GTX is set to high and back to low, the voltage difference A (VR-VS)=0. As a result, the photodiode readout signal is not distorted by the supply noise (or at least the distortion is reduced), and the noise performance of the image sensor is improved. Capacitors C1 and C2 may be referred to as a first capacitor and a second capacitor, respectively.

Additional embodiments can be derived in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A pixel circuit of an imaging sensor, the pixel circuit comprising:
   a front-end circuit comprising a photodiode configured to generate electrical charges that accumulate at a floating diffusion FD0 as a photodiode voltage, wherein the front-end circuit is configured for receiving a supply voltage PIXVDD;
   a signal storage circuit coupled to the front-end circuit, the signal storage circuit comprising:

a common floating diffusion FDC configured to store a common floating diffusion voltage corresponding to the photodiode voltage, wherein the common floating diffusion voltage includes a voltage noise component of the supply voltage PIXVDD;
   a unity gain circuit coupled to the signal storage circuit, the unity gain circuit comprising an operational amplifier configured to:
   couple the supply voltage PIXVDD and a reference voltage VREF as an input voltage to the operational amplifier; and
   generate a control voltage VCTRL as an output voltage, wherein the control voltage VCTRL includes the voltage noise component of the supply voltage PIXVDD; and
   an output circuit coupled to the signal storage circuit, wherein the output circuit is configured for outputting a signal voltage VS corresponding to the common floating diffusion voltage.

2. The pixel circuit of claim 1, wherein the signal storage circuit comprises:
   a reference voltage capacitor coupled to the control voltage VCTRL, wherein the reference voltage capacitor is configured to store a reference voltage VR; and
   a signal voltage capacitor coupled to the control voltage VCTRL, wherein the signal voltage capacitor is configured to store the signal voltage VS.

3. The pixel circuit of claim 2, wherein the reference voltage VR includes the voltage noise component of the supply voltage PIXVDD.

4. The pixel circuit of claim 3, wherein the signal voltage VS includes the voltage noise component of the supply voltage PIXVDD.

5. The pixel circuit of claim 4, wherein, at a time of a readout of the signal voltage VS, voltage noise components of the reference voltage VR and the signal voltage VS are the same.

6. The pixel circuit of claim 2, wherein the unity gain circuit further comprises:
   a first capacitor coupled to the supply voltage PIXVDD; and
   a second capacitor coupled to the first capacitor and to an input of the operational amplifier;
   wherein the operational amplifier is configured to output the control voltage VCTRL.

7. The pixel circuit of claim 6, wherein the unity gain circuit further comprises a tenth transistor having a drain coupled to a bias voltage VREF and a source coupled to the first capacitor and the second capacitor.

8. The pixel circuit of claim 6, wherein the front-end circuit further comprises a third transistor configured for transferring the common floating diffusion voltage to a readout circuit, and wherein:

$$C1/(C1+C2)=Cgd\_m3/(Cfd+Cgd\_m3)$$

where:
C1 is a capacitance of the first capacitor,
C2 is a capacitance of the second capacitor,
Cfd is a capacitance of the floating diffusion capacitor, and
Cgd_m3 is a gate-drain capacitance of the third transistor.

9. The pixel circuit of claim 8, wherein the photodiode voltage of the floating diffusion FD0 is transferred to the common floating diffusion voltage of the common floating diffusion FDC as:

$$FDC=FD0-Vgs\_m3$$

where:

Vgs_m3 is a gate-to-source voltage of the third transistor.

10. The pixel circuit of claim 9, wherein the photodiode voltage at the floating diffusion FD0 includes a noise component:

$$\Delta FD0 = (PIXVDD \text{ Supply noise}) * Cgd\_m3/(Cfd + Cgd\_m3),$$

where:

AFD0 represents the noise component photodiode voltage at the floating diffusion FD0, Cgd_m3 is the gate-drain capacitance of the third transistor, and Cfd is the capacitance of a floating diffusion capacitor Cfd.

11. A method for operating a pixel circuit of an imaging sensor, the method comprising:

generating, by a photodiode, electrical charges at a floating diffusion FD0 of a front-end circuit as a photodiode voltage, wherein the front-end circuit is coupled to a supply voltage PIXVDD, and wherein the supply voltage PIXVDD includes a voltage noise component;

transferring the photodiode voltage to a common floating diffusion FDC of a signal storage circuit that is coupled to the front-end circuit, wherein the photodiode voltage is transferred as a common floating diffusion voltage of the signal storage circuit, and wherein the common floating diffusion voltage includes the voltage noise component of the supply voltage PIXVDD;

generating, by a unity gain circuit, a control voltage VCTRL as an output voltage of the unity gain circuit, wherein the control voltage VCTRL includes the voltage noise component of the supply voltage PIXVDD, and wherein the unity gain circuit is coupled to the signal storage circuit;

storing, by the signal storage circuit, a reference voltage VR, wherein the reference voltage VR includes the voltage noise component of the supply voltage PIXVDD;

storing, by the signal storage circuit, a signal voltage VS, wherein the signal voltage VS includes the voltage noise component of the supply voltage PIXVDD, and wherein the signal voltage VS corresponds to the common floating diffusion voltage; and outputting the signal voltage VS by an output circuit that is coupled to the signal storage circuit.

12. The method of claim 11, further comprising:

storing the reference voltage VR by a reference voltage capacitor coupled to the control voltage VCTRL; and store the signal voltage VS by a signal voltage capacitor coupled to the control voltage VCTRL.

13. The method of claim 12, wherein the signal voltage VS includes the voltage noise component of the supply voltage PIXVDD, and wherein the signal voltage VS includes the voltage noise component of the supply voltage PIXVDD.

14. The method of claim 13, wherein, after a reset RST signal, voltage noise components of the reference voltage VR and the signal voltage VS are different.

15. The method of claim 14, wherein, at a time of a readout of the signal voltage VS, voltage noise components of the reference voltage VR and the signal voltage VS are the same.

16. The method of claim 12, wherein the unity gain circuit further comprises:

a first capacitor coupled to the supply voltage PIXVDD; and a second capacitor coupled to the first capacitor and to an input of an operational amplifier.

17. The method of claim 16, wherein the front-end circuit further comprises a third transistor configured for transferring the common floating diffusion voltage to a readout circuit, and wherein:

$$C1/(C1+C2) = Cgd\_m3/(Cfd+Cgd\_m3)$$

where:

C1 is a capacitance of the first capacitor,

C2 is a capacitance of the second capacitor,

Cfd is a capacitance of the floating diffusion capacitor, and

Cgd_m3 is a gate-drain capacitance of the third transistor.

18. The method of claim 17, wherein the photodiode voltage of the floating diffusion FD0 is transferred to the common floating diffusion voltage of the common floating diffusion FDC as:

$$FDC = FD0 - Vgs\_m3$$

where:

Vgs_m3 is a gate-to-source voltage of the third transistor.

19. The method of claim 18, wherein the photodiode voltage at the floating diffusion FD0 includes a noise component:

$$AFD0 = (PIXVDD \text{ Supply noise}) * Cgd\_m3/(Cfd + Cgd\_m3),$$

where:

AFD0 represents the noise component photodiode voltage at the floating diffusion FD0, Cgd_m3 is the gate-drain capacitance of the third transistor, and Cfd is the capacitance of the floating diffusion capacitor.

20. The method of claim 16, wherein the unity gain circuit further comprises a tenth transistor having a drain coupled to a bias voltage VREF and a source coupled to the first capacitor and the second capacitor.

* * * * *